United States Patent
Marripudi et al.

(10) Patent No.: US 10,049,004 B2
(45) Date of Patent: Aug. 14, 2018

(54) ELECTRONIC SYSTEM WITH MEMORY DATA PROTECTION MECHANISM AND METHOD OF OPERATION THEREOF

(71) Applicant: Samsung Electronics Co., Ltd., Suwon-si, Gyeonggi-Do (KR)

(72) Inventors: Gunneswara Marripudi, Fremont, CA (US); Harry Rogers, San Jose, CA (US); Fred Worley, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 81 days.

(21) Appl. No.: 15/063,302

(22) Filed: Mar. 7, 2016

(65) Prior Publication Data

US 2017/0168890 A1  Jun. 15, 2017

Related U.S. Application Data

(60) Provisional application No. 62/265,047, filed on Dec. 9, 2015.

(51) Int. Cl.
| | | |
|---|---|---|
| *G06F 11/00* | (2006.01) |
| *G06F 11/10* | (2006.01) |
| *G06F 1/28* | (2006.01) |
| *G06F 3/06* | (2006.01) |
| *G06F 11/20* | (2006.01) |

(52) U.S. Cl.
CPC ............ *G06F 11/1008* (2013.01); *G06F 1/28* (2013.01); *G06F 3/0619* (2013.01); *G06F 3/0647* (2013.01); *G06F 3/0685* (2013.01); *G06F 11/2015* (2013.01); *G06F 2201/85* (2013.01)

(58) Field of Classification Search
CPC .................................................. G06F 11/1008
USPC ............................... 714/6.1, 6.32, 22, 23, 24
See application file for complete search history.

(56) References Cited

U.S. PATENT DOCUMENTS

| | | | |
|---|---|---|---|
| 8,266,367 B2 | 9/2012 | Yu et al. | |
| 8,489,855 B2 | 7/2013 | Schuette | |
| 8,832,531 B2 | 9/2014 | Shalvi et al. | |
| 9,047,178 B2 | 6/2015 | Talagala et al. | |
| 2007/0180186 A1* | 8/2007 | Cornwell | G06F 12/023 711/103 |
| 2009/0046512 A1* | 2/2009 | Halloush | G11C 16/22 365/185.09 |
| 2013/0132652 A1* | 5/2013 | Wood | G06F 12/0246 711/103 |
| 2014/0297929 A1* | 10/2014 | Nellans | G06F 12/0246 711/103 |

(Continued)

*Primary Examiner* — Dieu-Minh Le
(74) *Attorney, Agent, or Firm* — Perspectives Law Group, Corp.

(57) ABSTRACT

An electronic system includes: a host processor; a system memory, coupled to the host processor, includes data persistence regions identified by the host processor; a non-volatile storage device, including a fast path write (FPW) reserved area, configured to store user data from the system memory in a non-volatile media; and a power monitor unit, coupled to the host processor, configured to detect a power loss by a primary power failure detector and assert a power-loss detection control; and wherein the host processor is configured to engage a RAM flush driver for moving the content of the data persistence regions to a fast path write (FPW) reserved area in the non-volatile media when the power-loss detection control is asserted.

20 Claims, 5 Drawing Sheets

(56) References Cited

U.S. PATENT DOCUMENTS

2015/0117107 A1\* 4/2015 Sun ........................ G11C 16/10
365/185.12

\* cited by examiner

ELECTRONIC SYSTEM WITH MEMORY DATA PROTECTION MECHANISM AND METHOD OF OPERATION THEREOF

CROSS REFERENCE TO RELATED APPLICATION(S)

This application claims the benefit of U.S. Provisional Patent Application Ser. No. 62/265,047 filed Dec. 9, 2015, and the subject matter thereof is incorporated by reference herein.

TECHNICAL FIELD

An embodiment of the present invention relates generally to an electronic system, and more particularly to a system for data storage functions for electronic systems.

BACKGROUND

In data processing systems, data protection is a primary requirement. In large data centers, administrators must ensure their facilities adopt all economically-viable data protection measures. A key concern is the protection and preservation of transient data that is held in system memory. The transient data can include databases, calculations, partially processed data, open documents, or a combination of all of these.

Over the years, a variety of data loss prevention measures have emerged, ranging from battery backup unit (BBU) methods, uninterruptable power supply (UPS) methods, carbon-based-fuel (e.g. diesel) generator methods, and charge storage capacitor based methods. Each approach, and combinations of them, attempts to preserve data held in volatile memory (e.g. DRAM). However, because of the intense cost competitiveness of today's business climate, the search for less-expensive methods to achieve data loss prevention continues.

Thus, a need still remains for electronic system with memory data protection mechanism to improve reliability and performance in computing environments. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a host processor; a system memory, coupled to the host processor, includes data persistence regions identified by the host processor; a non-volatile storage device, including a fast path write (FPW) reserved area, configured to store user data from the system memory in a non-volatile media; and a power monitor unit, coupled to the host processor, configured to detect a primary power failure and assert a power-loss detection control; and wherein the host processor is configured to engage a RAM flush driver for moving the content of the data persistence regions to the FPW reserved area in the non-volatile media when the power-loss detection control is asserted.

An embodiment of the present invention provides a method of operation of an electronic system including: accessing a system memory including identifying data persistence regions, by a host processor, within the system memory; storing user data, from the system memory, in a non-volatile media of a non-volatile storage device; asserting a power-loss detection control to the host processor; and engaging a RAM flush driver for moving the content of the data persistence regions to a fast path write (FPW) reserved area in the non-volatile media when the power-loss detection control is asserted.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
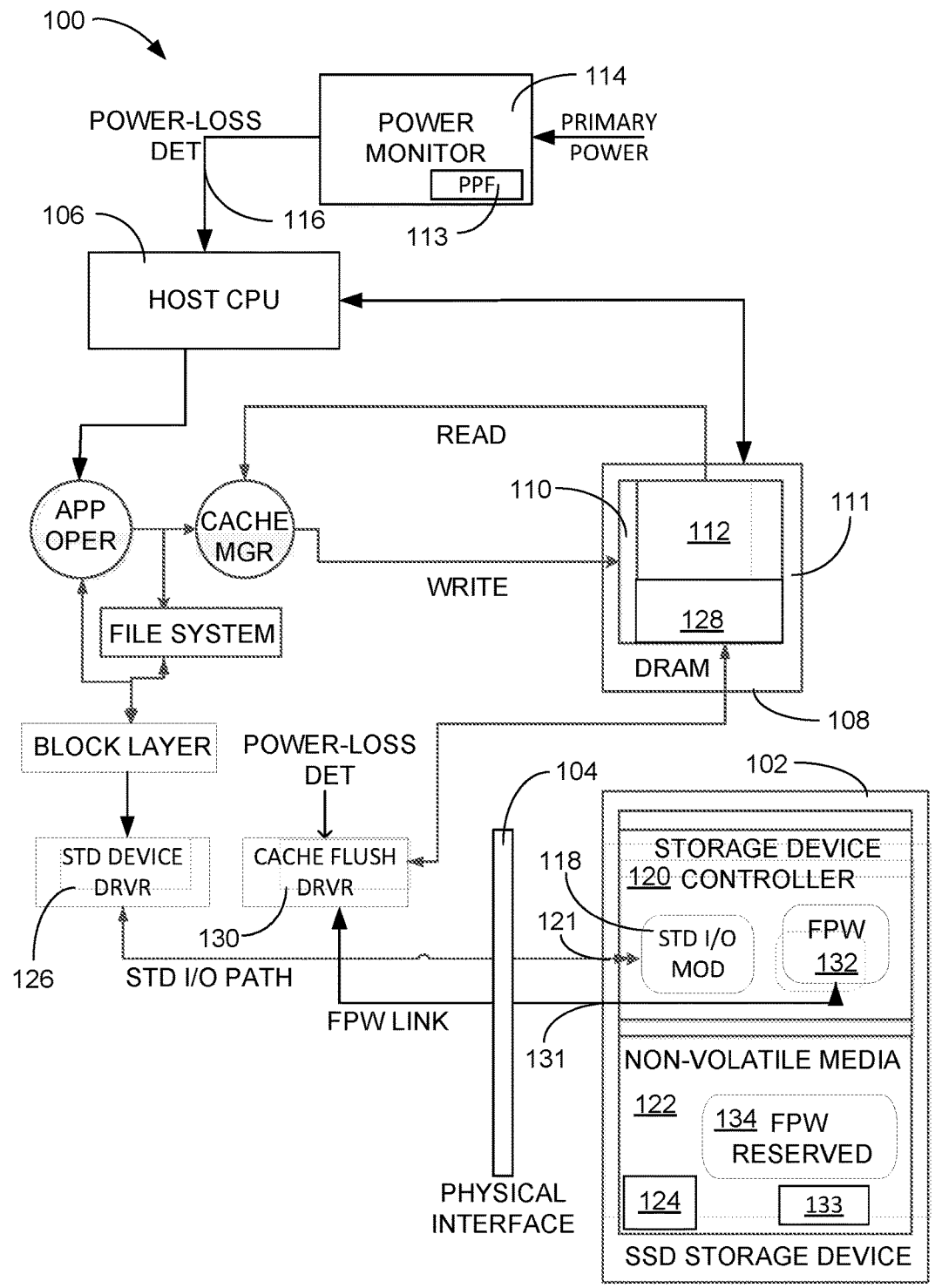
FIG. 1 is an architectural block diagram of an electronic system with memory data protection mechanism in an embodiment.

Various embodiments provide a memory data protection mechanism for transient data that can allow identification of areas within the system memory that can be designated as data preservation zones. The memory data protection mechanism can be configured on-the-fly to guard the data within the data preservation zones from loss due to unexpected power down. Embodiments can respond to unexpected power loss by transferring the data residing in the designated data preservation zones to a reserved location in a persistent storage device.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The term "unit" referred to herein is a circuit formed of hardware components or hardware state machines used for specific functions. The "unit" can be for used for timing critical functions and does not necessarily include software functions or support. The term "primary power" referred to herein is a source voltage that can be processed by a power supply for providing a reduced voltage, direct current power source. The term "secondary power" referred to herein is a conditioned direct current voltage provided by a power supply.

The term "primary power failure" referred to herein is a hardware detected failure of the primary voltage to a power supply, which can result in a secondary power failure at a later time. It is understood that the secondary power of the power supply can be the voltage source for electronic functions, such as processors, memory, interface controllers, storage devices, and the like.

Referring now to FIG. 1, therein is shown an architectural block diagram of an electronic system 100 with memory data protection mechanism in an embodiment. The electronic system 100 includes a non-volatile storage device 102, examples of such devices can include solid state storage devices (SSSD) based on Flash memory, magnetic random access memory (MRAM), Resistive Random Access Memory (RRAM), and Phase Change Memory (PCM), and the like, as well as hybrid disk storage devices, and key value storage adapters, which can be accessed through a physical interface 104. The non-volatile storage device 102 can be a non-volatile data storage mechanism that stores and accesses user data by way of a physical interface 104. The physical interface 104 can be a communication path between the non-volatile storage device 102 and a host processor 106 that utilizes a serial interface, a parallel interface, or a combination thereof, including fibre channel (FC), personal computer interface express (PCI-e), small computer system interface (SCSI), serial attached SCSI (SAS), serial advanced technology architecture (SATA), parallel advanced technology architecture (PATA), Ethernet, or Giga-bit Ethernet. The physical interface 104 can be capable of sub-unit addressing, second unit addressing, or separate stream-IDs.

The physical interface 104 can link the non-volatile storage device 102 to the host processor 106. The host processor 106 can be a microprocessor, a general purpose computer, a computer network, a server, a storage processor, graphics processing unit (GPU), application specific integrated circuit (ASIC), field programmable gate array (FPGA), programmable logic device (PLD), or the like. The host processor 106 can be coupled to a system memory 108 for storing and executing application software 110. The system memory 108 can be a volatile memory, typically dynamic random access memory (DRAM), that provides a workspace for the host processor 106. The system memory 108 includes the entire capacity of the DRAM memory. The host processor 106 can store metadata 111 in the system memory 108. The metadata 111 can include the memory map, condition flags, priority indicators, and any pointers required to execute the application software 110.

A portion of the system memory 108 can be dedicated as a data cache 112, which can be used to store transient data from the application software 110. The data cache 112 provides a faster storage of the transient data than moving it out to the non-volatile storage device 102. Since the system memory 108 is volatile memory, the application software 110 and the contents of the data cache 112 are susceptible to being lost during an event identified by a primary power failure detector 113, which can detect the absence of primary (AC) power while the secondary (DC) power is still present.

A power monitor unit 114 can be a hardware device that monitors the primary power, such as an alternating current (AC) source, of the electronic system 100 by the primary power failure detector 113. The power monitor unit 114 can be coupled to the host processor 106 to maintain secondary power, such as direct current (DC) power, for a limited period of time. The power monitor unit 114 can include a power supply, a power conditioner, a battery back-up unit, an uninterruptible power supply (UPS), or a combination thereof. A power-loss detection control 116, sourced from the power monitor unit 114, can alert the host processor 106 to the impending loss of the secondary power.

During normal operation, the host processor 106 can load the system memory 108 with the application software 110 from the non-volatile storage device 102 through a standard I/O module 118 in a storage device controller 120. The standard I/O module 118 can utilize the hardware resources of the storage device controller 120 to access a storage media 122, such as a non-volatile memory structure for storing the application software 110. The standard I/O module 118 can be accessed through a primary address 121 of the storage device controller 120 and is generally accessible for storing user data 124 as well as the application software 110. The communication through the physical interface 104 is coordinated by a standard device driver 126. The standard device driver 126 can translate the commands recognized by the standard I/O module 118 into a format that can be transferred by the physical interface 104.

An operating system of the host processor 106 can include support functions such as a cache manager, file system, application operational interface, and a block layer, which determines the number of logical block addresses (LBA's) that can be requested in the transfer to or from the non-volatile storage device 102. During normal operation the host processor 106 can utilize the operating system to manage the execution of the application software 110, including writing and reading data in the non-volatile storage device 102 and managing the data cache 112 in order to speed the execution of the application software 110.

In an embodiment, the host processor 106 can identify any number of regions within the system memory 108 as data persistence regions 128, which are high priority regions within system memory 108 that can contain cache data, metadata, application lists, or the like. The host processor 106 can designate contiguous portions, the entirety of the system memory 108, or scattered chunks of the system memory 108 as the data persistence regions 128. The data persistence regions 128 can include the application software 110, the metadata 111, the data cache 112, or any portion of the system memory 108 designated by the host processor 106. Upon assertion of the power-loss detection control 116, a RAM flush driver 130 can connect to a fast path write (FPW) sub-unit 132 within the storage device controller 120 to transfer the contents of the data persistence regions 128 to a FPW reserved space 134 in the non-volatile memory 122. It is understood that the FPW sub-unit 132 can include hardware and software that is dedicated to control the FPW reserved space 134, which is accessed by the RAM flush driver 130 through an FPW sub-unit address 131 of the physical interface 104. It is further understood that the RAM flush driver 130 can designate portions of the data persistence regions 128 to one or more of the non-volatile storage device 102.

The RAM flush driver 130 can access the FPW sub-unit address 131 of the physical interface 104 to address the FPW sub-unit 132 as a secondary unit ID of the non-volatile storage device 102. It is understood that the RAM flush driver 130 can address any number of units of the non-volatile storage device 102. The total content of the data persistence regions 128 is transferred to the FPW reserved space 134 before any reserve power is depleted and the contents of the system memory 108 are lost. The FPW sub-unit 132 can control a power failure (PF) condition flag 133 to indicate the assertion of the power-loss detection control 116. The PF condition flag 133 is maintained in non-volatile memory and persists beyond the power-down condition. The PF condition flag 133 is controlled by the FPW sub-unit 132 at the command of the RAM flush driver 130.

It is understood that the data persistence regions 128 can be rearranged by the host processor 106 at any time. Under normal power-down processes, the host processor 106 can gracefully save any data held in the system memory 108 without accessing the RAM flush driver 130 or the FPW reserved space 134. If the power-down is unexpected, the RAM flush driver 130 is automatically engaged to save the content of the data persistence regions 128.

The FPW sub-unit 132 can save the PF condition flag 133 indicating the power-loss detection control 116 was asserted and the FPW reserved space 134 contains the data from the data persistence regions 128 and the metadata indicating its location in the system memory 108. Upon a subsequent power-up, if the RAM flush driver 130 queries the FPW sub-unit 132 and determines the PF condition flag 133 is set, indicating the assertion of the power-loss detection control 116, the content of the FPW reserved space 134 can be restored in the data persistence regions 128 of the system memory 108 in order to resume the operation of the host processor 106 as quickly as possible.

It has been discovered that the electronic system 100 can enhance performance of the host processor 106 by allowing the content of the data persistence regions 128 to be automatically restored in the system memory 108 before the non-volatile storage device 102 presents a ready status on the physical interface 104 for normal operations, through a standard I/O module subunit 118. This recovery process can protect key data in the data persistence regions 128 that would normally be lost, requiring the host processor 106 to restart the application software 110 from an initial state.

It is understood that the RAM flush driver 130 is engaged upon an unexpected power-down and the power-loss detection control 116 can be disabled by the host processor 106 during normal power-down processes. The host processor 106 can choose to engage the RAM flush driver 130 periodically without the assertion of the power-loss detection control 116 in order to reduce the time required to save the data persistence regions 128 to the non-volatile storage device 102 in the event the primary power failure detector 113 does detect the power loss. The host processor 106 can change the definition of the data persistence regions 128 to meet incremental storage needs. It is further understood that the RAM flush driver 130 only communicates, through the FPW sub-unit address 131 of the non-volatile storage device 102, to the FPW sub-unit 132. This provides direct access to the FPW reserved space 134.

The RAM flush driver 130 can verify the state of the PF condition flag 133 on every power-up cycle of the host processor 106. It is further understood that the restoration of the data persistence regions 128 can extend the system boot time of the host processor 106.

It is also understood that the electronic system 100 can utilize more than one of the RAM flush driver 130 to address the susceptibility of the system memory 108 and decrease the time required to flush and restore the data persistence regions 128. This approach can be extremely beneficial when the electronic system 100 includes multiple of the host processor 106 or multiple of the non-volatile storage device 102. By reducing the time required to flush and restore the data persistence regions 128, the complexity and cost of the power monitor unit 114 can be reduced.

Figure 2:
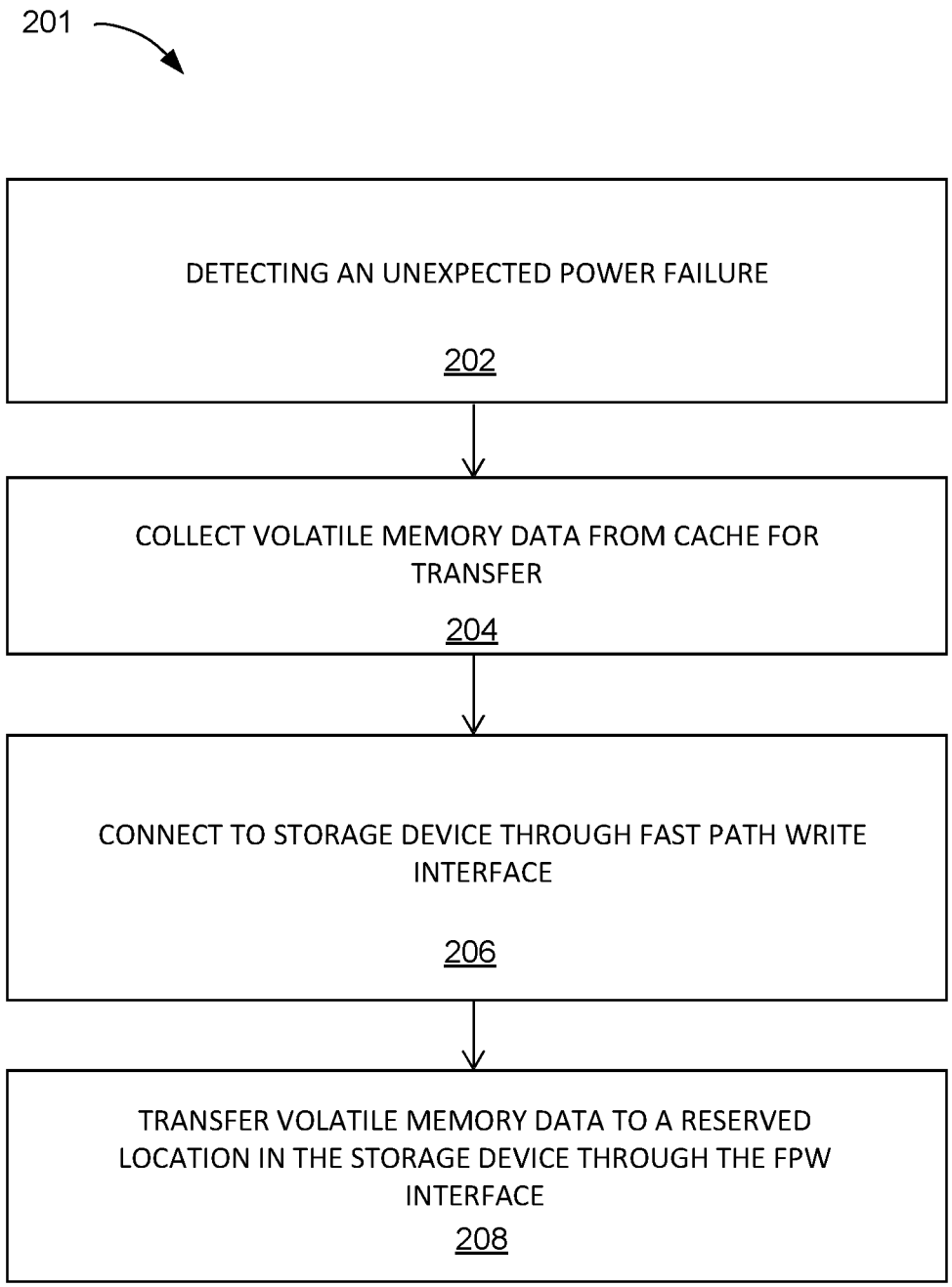
FIG. 2 is a flow chart of a volatile memory flush of cache data to the non-volatile storage device in an embodiment.

Referring now to FIG. 2, therein is shown a flow chart of a volatile memory flush 201 of cache data to the non-volatile storage device 102 in an embodiment. The flow chart of the volatile memory flush 201 of cache data to the non-volatile storage device 102 of FIG. 1 depicts a process by which the RAM flush driver 130 of FIG. 1 is engaged by an unexpected power-down. Detecting an unexpected primary power failure in a block 202 can be performed by the power monitor unit 114 of FIG. 1, which can be detected by the primary power failure detector 113 indicating a loss of primary power (AC) while the secondary power (DC) persists for some time. The power monitor unit 114 can alert the host processor 106 of FIG. 1 to this condition by asserting the power-loss detection control 116 of FIG. 1. The host processor 106 can block the assertion of the power-loss detection control 116 for an expected power-down process.

The flow proceeds to a collect volatile memory data from cache for transfer block 204. Once the power-loss detection control 116 is asserted, the RAM flush driver 130 of FIG. 1 can access the system memory 108 of FIG. 1 to retrieve the locations identified as the data persistence regions 128 of FIG. 1 by the host processor 106. The RAM flush driver 130 can utilize a scatter/gather technique to access the data persistence regions 128 and identify a total byte count for the cache flush operation.

The flow proceeds to a connect to storage device through FPW interface block 206. The RAM flush driver 130 can connect to the FPW sub-unit 132 of FIG. 1 in order to prepare the non-volatile storage device 102 to receive the contents of the data persistence regions 128. It is understood that the FPW sub-unit 132 can be configured for a fixed amount of storage for the data persistence regions 128 or there can be a variable storage capacity. The transfer conditions can be pre-arranged. The transfer conditions can include the packet size, number of packets transferred prior to an interface acknowledgement, buffer allocation length, interface timing, and the like.

The flow then proceeds to a transfer volatile memory data to a reserved location in the storage device through the FPW interface block 208. The RAM flush driver 130 can execute the transfer of the contents of the data persistence regions 128 from the system memory 108 to the FPW reserved space 134 in the non-volatile media 122 of FIG. 1.

It is understood that the host processor 106 is alerted to the assertion of the power-loss detection control 116 and can halt the execution of the application software 110 of FIG. 1, while the RAM flush driver 130 utilizes the physical interface 104 of FIG. 1 to communicate with the FPW sub-unit 132 and transfers the content of the data persistence regions 128 to the FPW reserved space 134 prior to the depletion of the secondary power.

It has been discovered that an embodiment of the electronic system 100 of FIG. 1 can preserve data stored in areas of the system memory 108 designated by the host processor 106 as the data persistence regions 128. The content of the data persistence regions 128 can be transferred to the FPW reserved space 134 of the non-volatile storage device 102 when the power-loss detection control 116 is asserted due to detecting a failure of the primary power while the secondary power remains active for a limited time. The preservation of the data content of the data persistence regions 128 can allow recovery from the power failure without restarting the application software 110 from the beginning.

Figure 3:
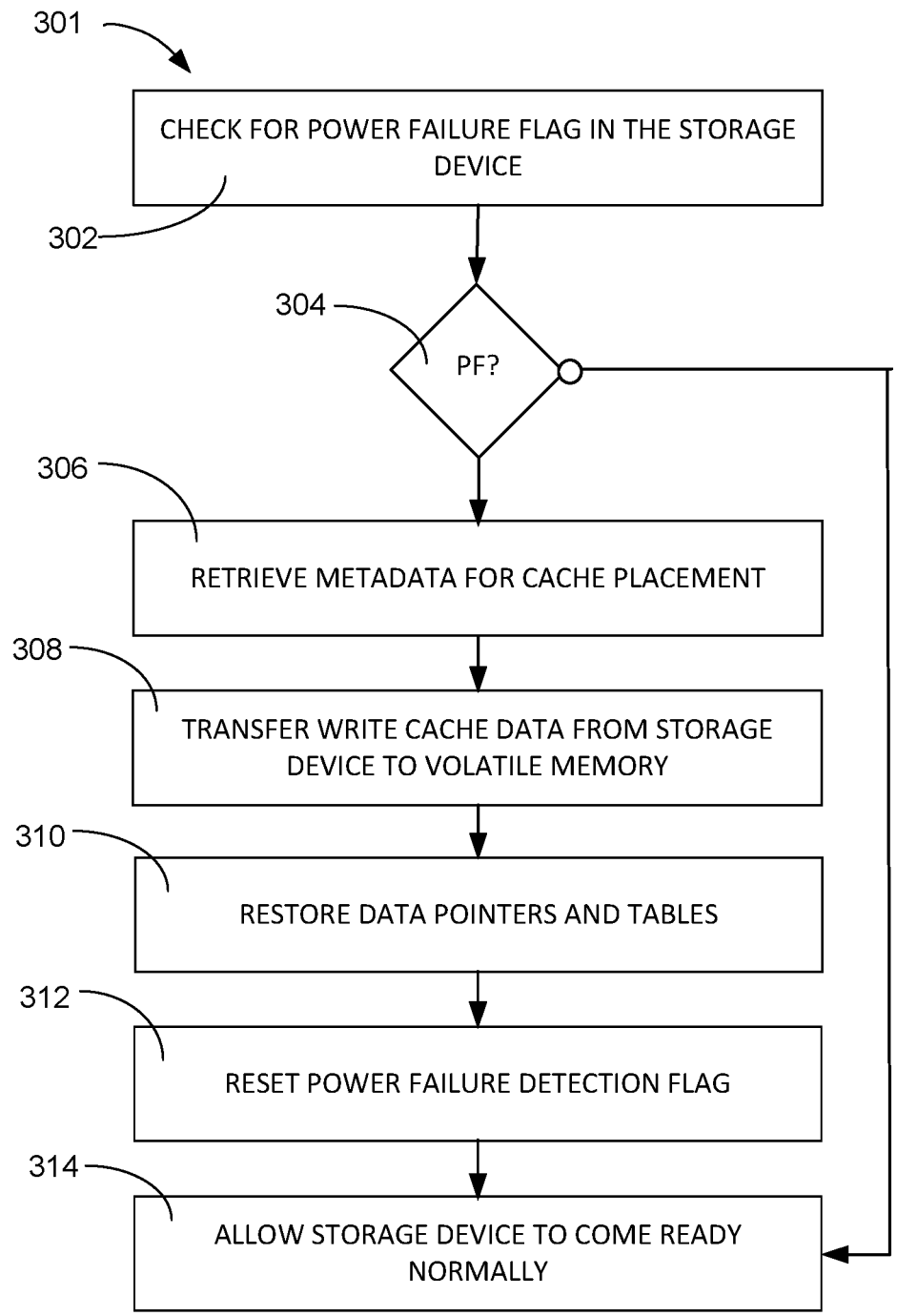
FIG. 3 is a flow chart of a volatile memory restore of cache data from the non-volatile storage device in an embodiment.

Referring now to FIG. 3, therein is shown a flow chart of a volatile memory restore 301 of cache data from the non-volatile storage device 102 of FIG. 1 in an embodiment. The flow chart of the volatile memory restore 301 of cache data from the non-volatile storage device 102 depicts a power-on sequence of the electronic system 100 of FIG. 1. The host processor 106 of FIG. 1 can cause the RAM flush driver 130 of FIG. 1 to interrogate the FPW sub-unit 132 in order to execute a check for power failure flag in the storage device block 302. The FPW sub-unit 132 can pass back the state of the PF condition flag 133 of FIG. 1 to the RAM flush driver 130.

A power failure check block 304 can detect the condition of the PF condition flag 133. If the PF condition flag 133 is asserted, indicating that the primary power failure detector 113 of FIG. 1 did detect the power loss, the flow proceeds to a retrieve metadata for cache placement block 306. The metadata 111 of FIG. 1 can include a description of the data persistence regions 128 of FIG. 1 by location and length within the system memory 108 of FIG. 1. The RAM flush driver 130 can load the metadata 111 as a scatter/gather function in order to identify the locations of the application software 110 and the cache data 112 while restoring the system memory 108.

The flow then proceeds to a transfer write cache data from storage device to volatile memory block 308. The content of the FPW reserved space 134 of FIG. 1 can be transferred by the FPW sub-unit 132 and the RAM flush driver 130 and restored to a pre-power failure location in the system memory 108. The FPW sub-unit 132 can provide a sequence end to the RAM flush driver 130 upon completion of the transfer from the FPW reserved space 134.

The flow then proceeds to a restore data pointers and tables block 310. The RAM flush driver 130 can load the LBA tables used by the host processor 106 in accessing the system memory 108 during the execution of the application software 110 of FIG. 1. The data pointers can indicate the current execution point relative to the data that was restored to the data persistence regions 128.

The flow then proceeds to a reset power failure detection flag block 312. The RAM flush driver 130 can instruct the FPW sub-unit 132 to initialize the PF condition flag 133 to a negated state. If a recurrence of the power loss is detected by the primary power failure detector 113 prior to the initialization of the PF condition flag 133, the entirety of the volatile memory restore 301 would be repeated without losing any of the data. After the PF condition flag 133 has been initialized, the RAM flush driver 130 would once again be ready to perform the volatile memory flush 201 of FIG. 2 in order to preserve the contents of the data persistence regions 128. It is understood that the restoration of the content of the data persistence regions 128 can occur before the non-volatile storage device 102 actually comes ready for interface operations by the standard device driver 126 of FIG. 1. Once the non-volatile storage device 102 is ready for operations, the host processor 106 can resume operations in the same step of the application software 110 that was executing prior to the assertion of the power-loss detection control 116 of FIG. 1.

The flow then proceeds to an allow storage device to come ready normally block 314. This is also the entry point if the power failure check block 304 does not detect the PF condition flag 133 was asserted. The non-volatile storage device 102 can switch control from the FPW sub-unit 132 to the standard I/O module 118 of FIG. 1 in order to perform a standard initialization of the interface and background tasks. Upon completion of the initialization of the non-volatile storage device 102, the standard I/O module 118 can indicate a ready condition to the standard device driver 126.

It has been discovered that the volatile memory restore 301 of the cache data from the non-volatile storage device 102 can allow the host processor 106 to resume operations as though the power loss detected by the primary power failure detector 113 did not occur. By restarting the application software 110 in the same location with all of the transient data intact, a significant amount of processing time can be saved. By limiting the volatile memory restore 301 to only the portions of the system memory 108 that the host processor 106 has designated as the data persistence regions 128, any critical data can be restored without dramatically increasing the time required to initialize the electronic system 100.

Figure 4:
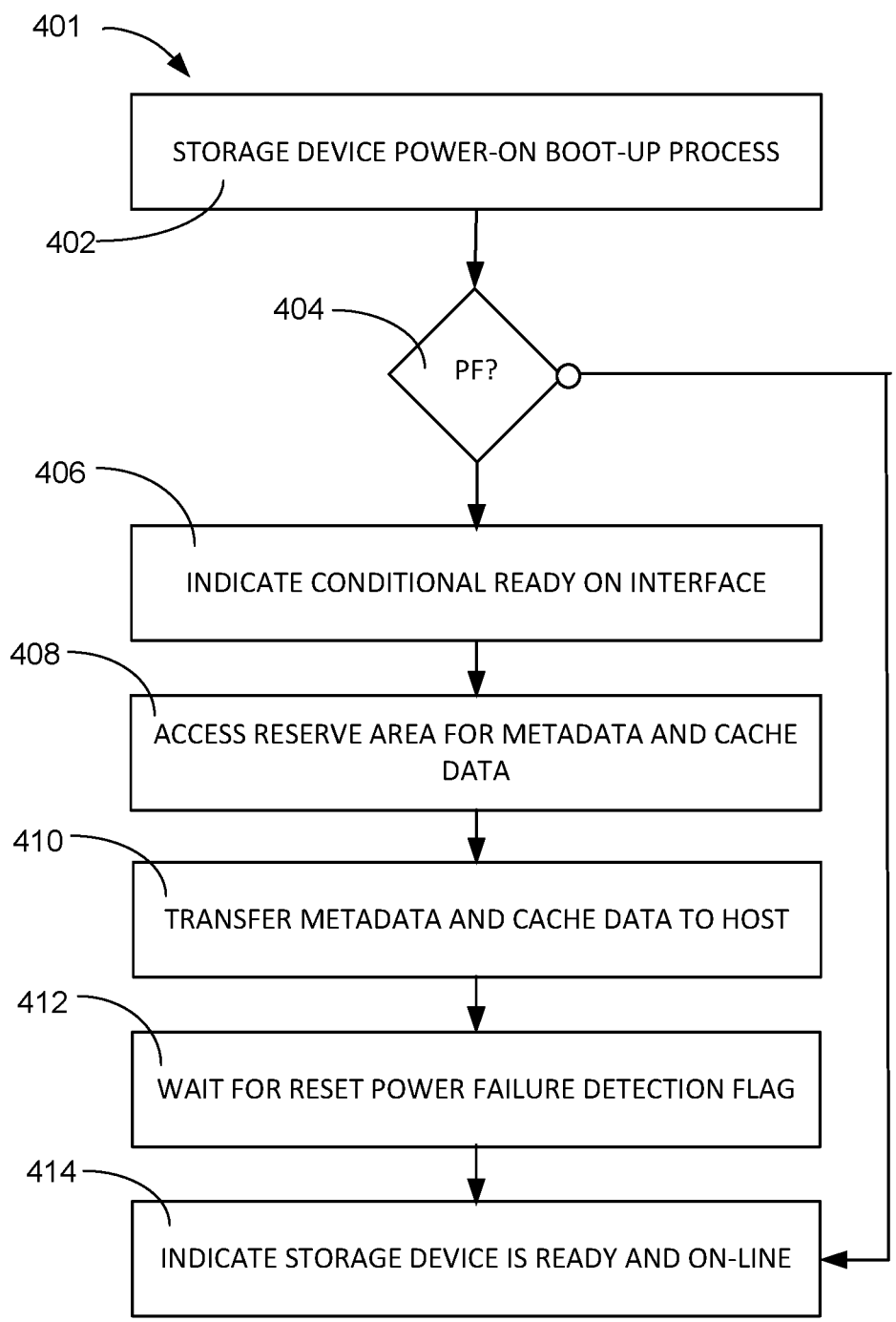
FIG. 4 is a flow chart of the non-volatile storage device power-on initialization process in an embodiment.

Referring now to FIG. 4, therein is shown a flow chart of the non-volatile storage device power-on initialization process 401 in an embodiment of the present invention. The flow chart of the non-volatile storage device 102 of FIG. 1 power-on initialization process 401 depicts a storage device power-on boot-up process block 402, in which the standard I/O module 118 of FIG. 1 can start a power-on initialization of the non-volatile storage device 102. The flow can proceed to a check for power failure detected block 404. The standard I/O module 118 can read the PF condition flag 133 of FIG. 1 to determine if it is asserted.

If the PF condition flag 133 is asserted, the flow proceeds to an indicate conditional ready on interface block 406. The standard I/O module 118 can pass control of the process to the FPW sub-unit 132 of FIG. 1. The FPW sub-unit 132 can initialize the FPW sub-unit address 131 of FIG. 1 in the physical interface 104 of FIG. 1 in order to commence communication with the RAM flush driver 130 of FIG. 1. The initialization of the sub-unit address 131 in the physical interface 104 can indicate that the non-volatile storage device 102 is prepared for special purpose communication only. This condition can be recognized by the RAM flush driver 130 as a conditional ready for restoration of the data persistence regions 128 of FIG. 1, but is not recognized by the standard device driver 126 of FIG. 1. This conditional ready caused by the initialization of the FPW sub-unit address 131 in the physical interface 104 can trigger the RAM flush driver 130 to start the volatile memory restore 301 of FIG. 3.

The flow then proceeds to an access reserve area for metadata and cache data block 408. The FPW sub-unit 132 can retrieve the metadata and cache data from the FPW reserved space 134 of FIG. 1. It is understood that the FPW reserved space 134 can be a fixed location with a predetermined reserved capacity that is only accessed for the preservation and restoration of the data persistence regions 128. The FPW reserved space 134 is only accessed by a background process, such as a garbage collection process after the PF condition flag 133 is initialized and is not serviced during normal operation of the non-volatile storage device 102.

The flow then proceeds to a transfer metadata and cache data to host block 410. The FPW sub-unit 132 can observe the protocol required by the physical interface 104 in order to transfer the metadata initially, followed by the data content of the data persistence regions 128. The FPW sub-unit 132 can support the complete transfer and handshake processes required by the physical interface 104. It is understood the all of the transfers associated with the FPW sub-unit 132 occur through the FPW sub-unit address 131 of FIG. 1 in the physical interface 104 communicating directly with the RAM flush driver 130.

Upon successful completion of the transfer, the flow proceeds to a wait for reset power failure detection flag block 412. The FPW sub-unit 132 can wait for a command from the RAM flush driver 130 to initialize the PF condition flag 133, which indicates the content of the data persistence regions 128 has been successfully restored and the PF condition flag 133 can be negated. The FPW sub-unit 132 can then clear the FPW reserved space 134 in preparation for a next assertion of the power-loss detection control 116 of FIG. 1.

The flow then proceeds to an indicate storage device is ready and on-line block 414. This is also the entry point if the check for power failure detected block 404 determines that the PF condition flag 133 was already initialized, indicating a normal power-down process had occurred. The control of the non-volatile storage device 102 can be passed to the standard I/O module 118, which can perform the initialization of the storage device controller 120 in preparation for normal operations. The standard I/O module 118 can initialize the primary address 121 of FIG. 1 on the physical interface 104 to indicate that the non-volatile storage device 102 is ready to commence data exchanges through the standard device driver 126.

It is understood that the standard I/O module 118 can include a device processor executing operational firmware to support the normal operations of the non-volatile storage device 102. It is further understood that the FPW sub-unit 132 can be an alternate firmware set executing on the same device processor or an additional device processor.

Figure 5:
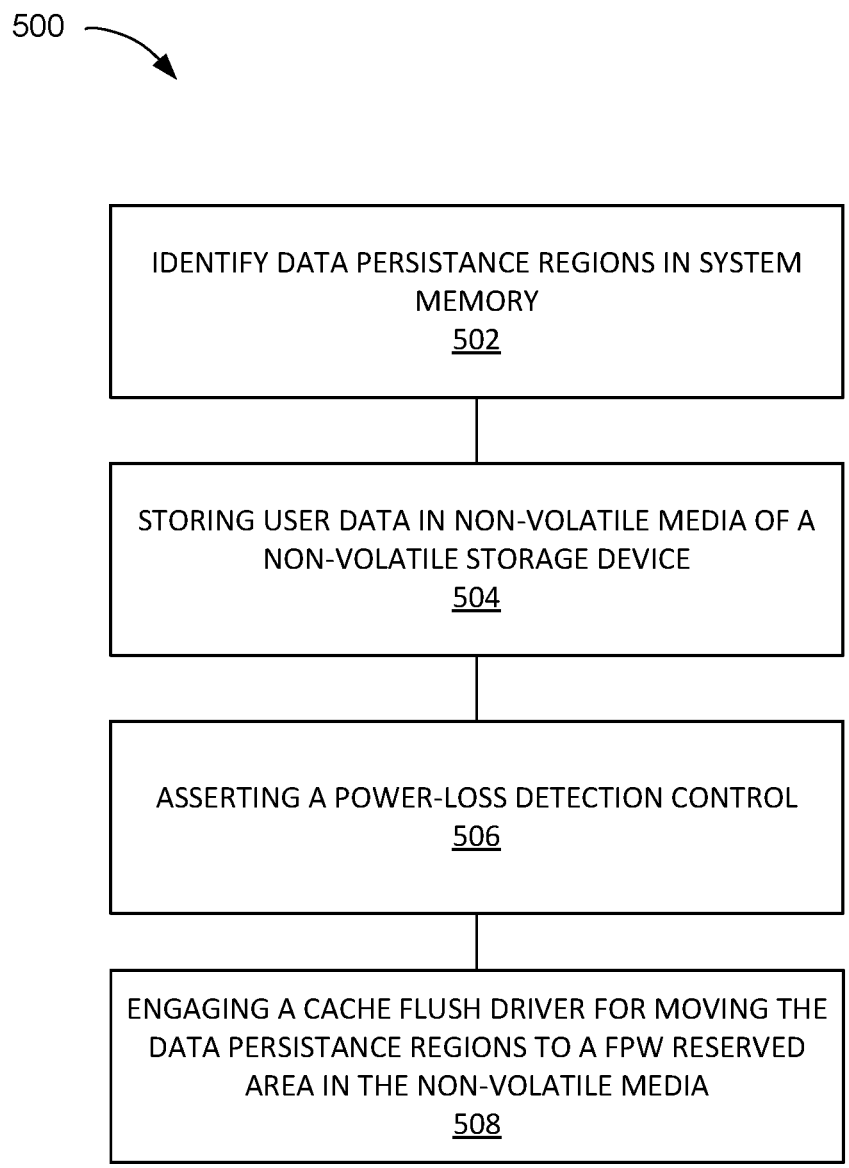
FIG. 5 is a flow chart of a method of operation of an electronic system in a further embodiment of the present invention.

Referring now to FIG. 5, therein is shown a flow chart of a method 500 of operation of an electronic system 100 in a further embodiment of the present invention. The method 500 includes: accessing a system memory including identifying data persistence regions, by a host processor, within the system memory in a block 502; storing user data, from the system memory, in a non-volatile media of a non-volatile storage device in a block 504; asserting a power-loss detection control to the host processor in a block 506; and engaging a RAM flush driver for moving the content of the data persistence regions to a fast path write (FPW) reserved area in the non-volatile media when the power-loss detection control is asserted in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
   a host processor;
   a system memory, coupled to the host processor, includes data persistence regions identified by the host processor;
   a non-volatile storage device, including a fast path write (FPW) reserved area, configured to store user data from the system memory in a non-volatile media; and
   a power monitor unit, coupled to the host processor, configured to detect a power loss by a primary power failure detector and assert a power-loss detection control; and
   wherein the host processor is configured to engage a RAM flush driver for moving the content of the data persistence regions to a fast path write (FPW) reserved area in the non-volatile media when the power-loss detection control is asserted including transferring contents of the data persistence regions in the system memory through a physical interface to the FPW reserved area.

2. The system as claimed in claim 1 wherein the host processor is configured to engage a RAM flush driver includes an FPW sub-unit address of the non-volatile storage device accessed by the RAM flush driver.

3. The system as claimed in claim 1 wherein the host processor is configured to engage a RAM flush driver to access an FPW sub-unit, in a storage device controller of the non-volatile storage device, dedicated to control the FPW reserved area.

4. The system as claimed in claim 1 wherein the host processor is configured to engage a RAM flush driver for restoring the content of the data persistence regions from the FPW reserved area on power-on.

5. The system as claimed in claim 1 further comprising a physical interface, between the host processor and the non-volatile storage device, provides a primary address and an FPW sub-unit address.

6. The system as claimed in claim 1 further comprising a standard I/O module in the non-volatile storage device configured to transfer the user data to the system memory by way of a standard device driver.

7. The system as claimed in claim 1 wherein the data persistence regions are copied to the FPW reserved area upon assertion of the power-loss detection control and restored to the system memory upon a subsequent power-on.

8. A non-volatile storage device includes:
   a storage device controller, coupled to a host processor, including a standard I/O module and a fast path write (FPW) sub-unit configured to receive contents of data persistence regions in a system memory through a physical interface when a power-loss detection control is asserted by a power monitor unit; and a storage media, coupled to the storage device controller, including a FPW reserved area accessed by the FPW sub-unit when the host processor engages a RAM flush driver for moving the contents of data persistence regions to the FPW reserved area.

9. The device as claimed in claim 8 wherein the non-volatile storage device includes a power failure (PF) condition flag, controlled by the FPW sub-unit, to indicate the content of the data persistence regions is stored in the FPW reserved area.

10. The system as claimed in claim 1 wherein the non-volatile storage device includes a primary address and the FPW sub-unit accessed through a FPW sub-unit address.

11. A method of operation of an electronic system comprising:
 accessing a system memory including identifying data persistence regions, by a host processor, within the system memory;
 storing user data, from the system memory, in a non-volatile media of a non-volatile storage device;
 asserting a power-loss detection control, by a power monitor unit, to the host processor; and
 engaging a RAM flush driver, by the host processor, for moving the contents of the data persistence regions to a fast path write (FPW) reserved area in the non-volatile media when the power-loss detection control is asserted including transferring contents of the data persistence regions in the system memory through a physical interface to the FPW reserved area.

12. The method as claimed in claim 11 wherein engaging the RAM flush driver includes accessing an FPW sub-unit address of the non-volatile storage device by the RAM flush driver.

13. The method as claimed in claim 11 further comprising accessing a FPW sub-unit, in a storage device controller of the non-volatile storage device, dedicated to controlling the FPW reserved area.

14. The method as claimed in claim 11 further comprising restoring the content of the data persistence regions from the FPW reserved area on power-on.

15. The method as claimed in claim 11 further comprising providing a primary address and an FPW sub-unit address in a physical interface for accessing the non-volatile storage device.

16. The method as claimed in claim 11 further comprising transferring the user data to the system memory by way of the standard device driver accessing a standard I/O module in the non-volatile storage device.

17. The method as claimed in claim 11 further comprising monitoring a power failure (PF) condition flag, controlled by a FPW sub-unit, for indicating the content of the data persistence regions is stored in the FPW reserved area.

18. The method as claimed in claim 11 further comprising accessing a storage device controller including accessing a standard I/O module through a primary address and accessing an FPW sub-unit through an FPW sub-unit address.

19. The method as claimed in claim 11 further comprising protecting the data persistence regions from a primary power failure by the power monitor unit, the RAM flush driver, and the non-volatile storage device.

20. The method as claimed in claim 11 further comprising copying the data persistence regions to the FPW reserved area upon assertion of the power-loss detection control and restoring the data persistence regions to the system memory upon a subsequent power-on.

* * * * *